(12) United States Patent
Tsuduki

(10) Patent No.: US 12,724,657 B2
(45) Date of Patent: Sep. 1, 2026

(54) INFORMATION PROCESSING APPARATUS, FACTOR ANALYSIS METHOD AND COMPUTER-READABLE RECORDING MEDIUM

(71) Applicant: Yokogawa Electric Corporation, Tokyo (JP)

(72) Inventor: Jun Tsuduki, Tokyo (JP)

(73) Assignee: Yokogawa Electric Corporation, Tokyo (JP)

( * ) Notice: Subject to any disclaimer, the term of this patent is extended or adjusted under 35 U.S.C. 154(b) by 78 days.

(21) Appl. No.: 18/137,861

(22) Filed: Apr. 21, 2023

(65) Prior Publication Data

US 2023/0350745 A1 Nov. 2, 2023

(30) Foreign Application Priority Data

Apr. 27, 2022 (JP) ................................ 2022-073703

(51) Int. Cl.
*G06F 11/00* (2006.01)
*G06F 11/07* (2006.01)

(52) U.S. Cl.
CPC .......... *G06F 11/079* (2013.01); *G06F 11/076* (2013.01)

(58) Field of Classification Search
None
See application file for complete search history.

(56) References Cited

U.S. PATENT DOCUMENTS 11,200,142 B2 * 12/2021 Olson ................ G06F 11/3452
11,438,211 B1 * 9/2022 Lyubomirsky ...... H04L 41/0654
2010/0280335 A1 11/2010 Carlson et al.
2019/0289025 A1 * 9/2019 Kursun ................ G06F 16/285
2021/0058154 A1 * 2/2021 Musumeci ......... H04B 10/0793
2021/0405610 A1 * 12/2021 Uchida .................. G06Q 10/20
2024/0184858 A1 * 6/2024 Lindner ............. G06F 18/2113

FOREIGN PATENT DOCUMENTS

CN 112912807 A 6/2021
JP 2009116427 A 5/2009
JP 2018120407 A 8/2018
(Continued)

OTHER PUBLICATIONS

Google Scholar/Patents search—text refined (Year: 2024).*
(Continued)

*Primary Examiner* — Christopher S McCarthy
(74) *Attorney, Agent, or Firm* — Osha Bergman Watanabe & Burton LLP

(57) ABSTRACT

An information processing apparatus includes: a controller that: acquires channel measurement data for each of one or more channels that is a measurement target, and calculates, for each of the one or more channels, an error-contribution ratio based on a score determined for each of parameters extracted from the channel measurement data acquired for each of the one or more channels, the error-contribution ratio indicating a degree by which each of the one or more channels contributes an error, and the score being determined based on a difference between each of the parameters and a classification boundary used by a machine learning model that classifies the parameters into one of an error class and a normal class.

8 Claims, 11 Drawing Sheets

(56) References Cited

FOREIGN PATENT DOCUMENTS

| | | |
|---|---|---|
| JP | 2019121065 A | 7/2019 |
| JP | 2021002295 A | 1/2021 |

OTHER PUBLICATIONS

Google Scholar/Patents search—text refined (Year: 2025).*
Google Scholar/Patents search—text refined (Year: 2026).*
Sahakyan, et al., "Explainable Artificial Intelligence for Tabular Data: A Survey", IEEE Access, 2021, vol. 9, pp. 135392-135422, (31 pages).
Pereira, et al., Context-based Trajectory Descriptor for Human Activity Profiling, 2014 IEEE International Conference on Systems, Man, and Cybernetics (SMC), Oct. 5, 2014, pp. 2385-2390, (6 pages).
Extended European Search Report issued in corresponding European Patent Application No. 23169037.1, dated Sep. 1, 2023, (9 pages).
Notice of Reasons for Refusal issued in corresponding Japanese Patent Application No. 2022-073703, mailed Jan. 21, 2025, with translation (6 pages).
Office Action issued in corresponding Chinese Patent Application No. 202310447183.0, dated Dec. 11, 2025, with translation (14 pages).
Office Action issued in corresponding Chinese Patent Application No. 202310447183.0, dated Jun. 26, 2026, with translation (12 pages).

* cited by examiner

INFORMATION PROCESSING APPARATUS
10
STORAGE UNIT
13
MEASUREMENT DATA LOG
13A
DIAGNOSIS MODEL
13B
HS LOG
13C
ERROR-CONTRIBUTION RATIO LOG
13D
CONTROL UNIT
15
MEASUREMENT DATA ACQUIRING UNIT
15A
ERROR DETERMINING UNIT
15B
HS
PARAMETER HS
ERROR-CONTRIBUTION RATIO CALCULATING UNIT
15C
OUTPUT CONTROL UNIT
15D
COMMUNICATION CONTROL UNIT
12
DISPLAY INPUT UNIT
11
SENSOR
20

FIG.4

| ch | PARAMETER 1 | PARAMETER 2 | PARAMETER 3 | PARAMETER 4 | PARAMETER 5 | TAKE SUM |
|---|---|---|---|---|---|---|
| ch1 | 0.01224 | 0.22005 | -0.043275 | -0.037099 | 0.35362 | 0.505536 |
| ch2 | 0.053674 | 0.18336 | 0.045444 | -0.023871 | 0.20514 | 0.463747 |
| ch3 | -0.12888 | -0.27475 | -0.0045138 | 0.04449 | -0.013306 | -0.37696 |
| ch4 | -0.054061 | -0.10893 | 0.0084574 | -0.04664 | -0.13106 | -0.33223 |

FIG.7

CHANNEL

| | |
|---|---|
| TEMPERATURE | 0.505536 |
| PRESSURE | 0.463747 |
| AMOUNT OF EXHAUST | -0.37696 |
| FLOW RATE | -0.33223 |

FIG.8

CHANNEL

| | |
|---|---|
| AMOUNT OF EXHAUST | -0.37696 |
| FLOW RATE | -0.33223 |
| PRESSURE | 0.463747 |
| TEMPERATURE | 0.505536 |

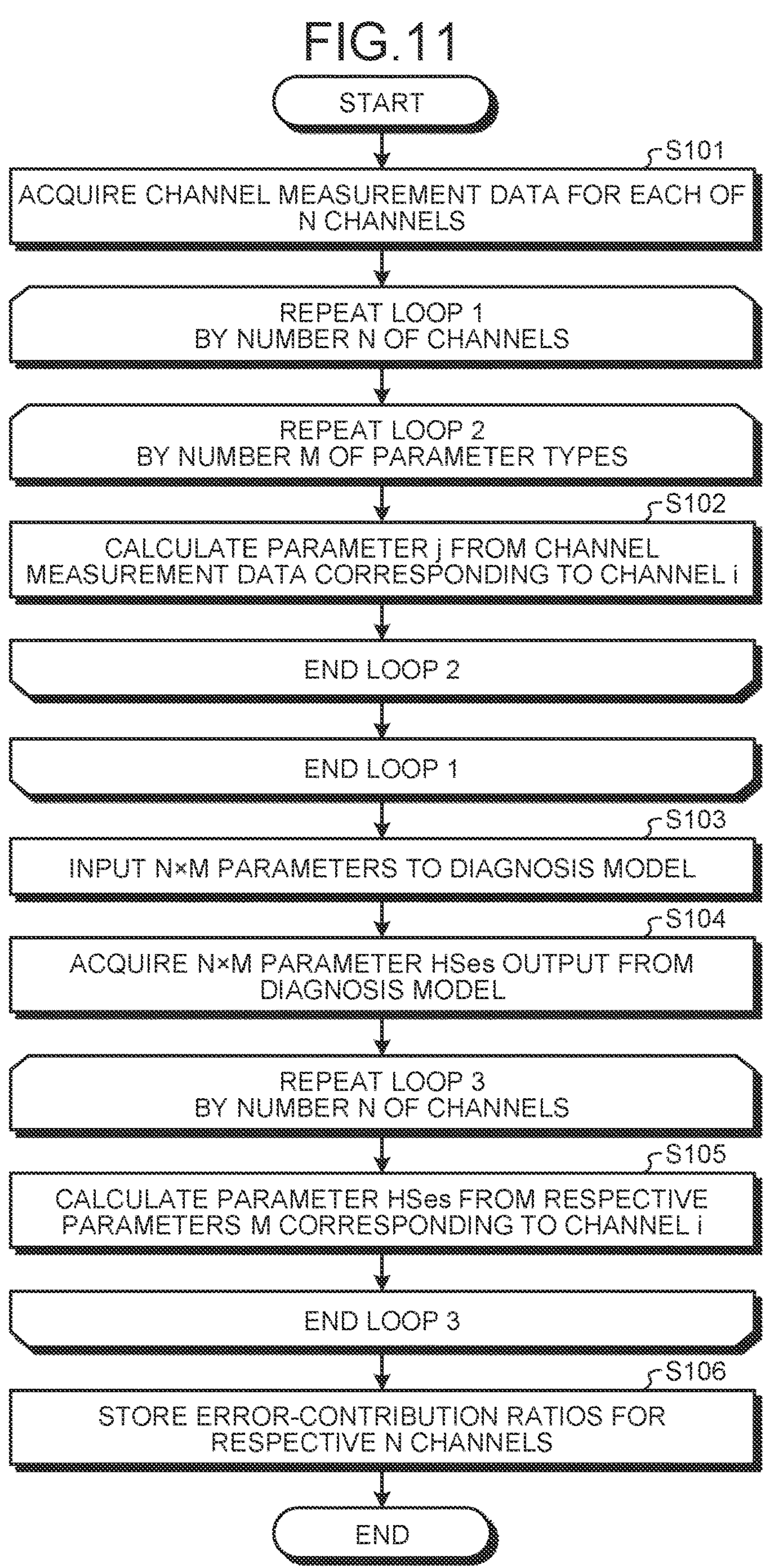
FIG.11
START
S101
ACQUIRE CHANNEL MEASUREMENT DATA FOR EACH OF N CHANNELS
REPEAT LOOP 1 BY NUMBER N OF CHANNELS
REPEAT LOOP 2 BY NUMBER M OF PARAMETER TYPES
S102
CALCULATE PARAMETER j FROM CHANNEL MEASUREMENT DATA CORRESPONDING TO CHANNEL i
END LOOP 2
END LOOP 1
S103
INPUT N×M PARAMETERS TO DIAGNOSIS MODEL
S104
ACQUIRE N×M PARAMETER HSes OUTPUT FROM DIAGNOSIS MODEL
REPEAT LOOP 3 BY NUMBER N OF CHANNELS
S105
CALCULATE PARAMETER HSes FROM RESPECTIVE PARAMETERS M CORRESPONDING TO CHANNEL i
END LOOP 3
S106
STORE ERROR-CONTRIBUTION RATIOS FOR RESPECTIVE N CHANNELS
END

INFORMATION PROCESSING APPARATUS, FACTOR ANALYSIS METHOD AND COMPUTER-READABLE RECORDING MEDIUM

CROSS-REFERENCE TO RELATED APPLICATION

The present application claims priority to and the benefit of Japanese Patent Application No. 2022-073703 filed on Apr. 27, 2022, the entire contents of which are incorporated herein by reference.

BACKGROUND

1. Technical Field

The present invention relates to an information processing apparatus, a factor analysis method, and a computer-readable recording medium.

2. Description of Related Art

A diagnostic model has been provided as a technology for determining an error or a sign of an error in a facility. Such a diagnostic model makes a diagnosis of the presence of an error based on measurement data that is a measurement of a condition of each measurement target, such as those of a piece of equipment used in the facility, upon completion of one batch corresponding to one process of a product manufacturing process. The related technologies are described, for example, in Japanese Patent Application Laid-open No. 2009-116427.

However, the diagnostic model described above has a limitation in that it only provides information related to whether there is an error in a batch, so that there has been an aspect that makes it difficult to provide a clue for investigating for a cause.

For example, when an error occurs, the diagnostic model described above fails to clarify which piece of equipment is causing the error in the facility. Therefore, a user such as a field worker needs to start from examining where to start the investigation, and much burden has been imposed on the user such as the field worker.

SUMMARY

One or more embodiments of the invention provide a technological improvement over such conventional technologies as discussed above. In particular, one or more embodiments of the present invention provide an information processing apparatus, a factor analysis method, and a computer-readable recording medium that aid investigations of a cause of an error by clarifying which piece of equipment is causing the error in the facility.

According to one aspect of embodiments, an information processing apparatus includes an acquiring unit (i.e., a controller) configured to acquire channel measurement data for each channel that is a measurement target, and a calculating unit (i.e. the controller) configured to calculate, for each the channel, an error-contribution ratio indicating a degree by which the channel contributes an error based on a score determined for each of parameters extracted from a plurality of respective pieces of channel measurement data acquired for each the channel, the score being determined based on a difference between each of the parameters and a classification boundary used by a machine learning model configured to classify the parameters into one of an error class and a normal class.

According to one aspect of embodiments, a factor analysis method includes acquiring channel measurement data for each channel that is a measurement target, and calculating, for each the channel, an error-contribution ratio indicating a degree by which the channel contributes an error based on a score determined for each of parameters extracted from a plurality of respective pieces of channel measurement data acquired for each the channel, the score being determined based on a difference between each of the parameters and a classification boundary used by a machine learning model configured to classify the parameters into one of an error class and a normal class.

According to one aspect of embodiments, a non-transitory computer-readable recording medium having stores therein a factor analysis program or instructions that cause a computer to execute a process including acquiring channel measurement data for each channel that is a measurement target, and calculating, for each the channel, an error-contribution ratio indicating a degree by which the channel contributes an error based on a score determined for each of parameters extracted from a plurality of respective pieces of channel measurement data acquired for each the channel, the score being determined based on a difference between each of the parameters and a classification boundary used by a machine learning model configured to classify the parameters into one of an error class and a normal class.

BRIEF DESCRIPTION OF THE DRAWINGS

FIG. 4 is a schematic diagram illustrating an example of a calculation of an error-contribution ratio;

FIG. 7 is a schematic illustrating a displaying example of the error-contribution ratios;

FIG. 8 is a schematic illustrating a displaying example of the error-contribution ratios;

FIG. 11 is a flowchart illustrating the sequence of an error-contribution ratio calculating process;

DETAILED DESCRIPTION OF EMBODIMENTS

Embodiments of an information processing apparatus, a factor analysis method, and a computer-readable recording medium will now be explained with reference to the appended drawings. Each of such embodiments merely provides a description of one example or one aspect only, and such an exemplary description is not intended to limit the scope of any values, functions, or usage conditions in any way. The embodiments may also be combined as appropriate within the scope not contradicting the processing.

Overall Configuration

Figure 1:
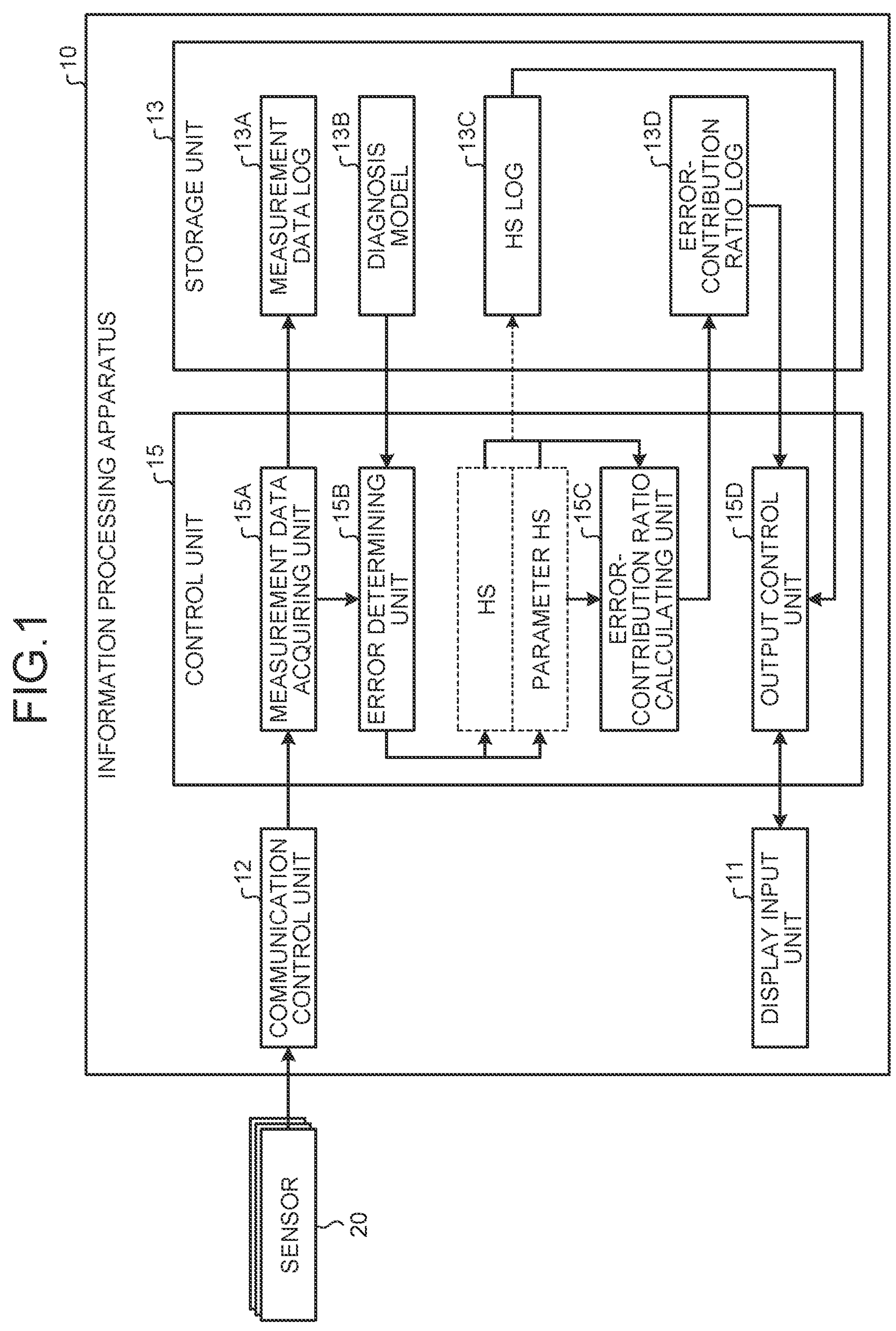
FIG. 1 is a block diagram illustrating an exemplary functional configuration of an information processing apparatus.

FIG. 1 is a block diagram illustrating an exemplary functional configuration of an information processing apparatus 10. The information processing apparatus 10 illustrated in FIG. 1 provides a factor analysis function for analyzing a factor of an error, from a viewpoint of assisting investigation of the cause of an error.

As illustrated in FIG. 1, the information processing apparatus 10 may be communicatively connected to a sensor 20. For example, the information processing apparatus 10 and the sensor 20 may communicate with each other, in accordance with some industrial wireless protocol. Such communication is, however, merely one example, and the communication performed between the information processing apparatus 10 and the sensor 20 is neither limited to a particular communication protocol, such as an industrial communication protocol, nor to wired or wireless communication.

The sensor 20 is one example of a measurement device for making a measurement of a condition of a target. Merely as an example, the sensor 20 may be implemented as a measurement device incorporated in a control loop, such as measurement, control calculation, or operation.

For example, as the sensor 20, one or more sensors 20 may be installed correspondingly to each measurement target referred to as a “channel”. The “channel” herein means a measurement target such as that of a piece of equipment used in a facility for manufacturing a product, and may include a physical quantity such as temperature, pressure, flow rate, pH, speed, acceleration, or valve aperture.

The sensors 20 installed correspondingly to the respective channels that are measurement targets transfer chronological data of measurements collected by the sensors 20, to the information processing apparatus 10. Hereinafter, the chronological data of the measurements corresponding to one of such channels will be sometimes referred to as “channel measurement data”. Channel measurement data corresponding to N channels, including a channel ch1 to a channel chN (where N is a natural number) is sometimes referred to as “measurement data”.

It is not always necessary for the sensor 20 to be installed in one-to-one relation with a channel, and one sensor 20 may measure a plurality of pieces of channel measurement data corresponding to a plurality of respective channels.

The information processing apparatus 10 is one example of a computer providing the factor analysis function mentioned above. Explained herein merely as one example is a configuration in which the factor analysis function is provided as one function of a recording apparatus that is what is called a recorder configured to record measurement data, but the configuration is not limited thereto. For example, the information processing apparatus 10 may be implemented as a server that provides the factor analysis function to an on-premise device. Alternatively, the information processing apparatus 10 may implement the function as a Platform-as-a-Service (PaaS) or Software-as-a-Service (SaaS) application, and provide the factor analysis function as a cloud service.

Configuration of Information Processing Apparatus 10

An exemplary functional configuration of the information processing apparatus 10 according to one or more embodiments will now be explained. FIG. 1 illustrates schematized blocks that are relevant to the factor analysis function of the information processing apparatus 10. As illustrated in FIG. 1, the information processing apparatus 10 includes a display input unit (or a display input device) 11, a communication control unit (or a communication control device) 12, a storage unit 13 (or a storage), and a control unit (or a controller) 15 that may comprise a central processing unit (CPU). FIG. 1 illustrates only extraction of the functional units that are relevant to the factor analysis function, and the information processing apparatus 10 may include functional units other than those illustrated.

The display input unit 11 is a functional unit that receives various operation inputs, and displays various types of information. Merely as one example, the display input unit 11 may be implemented as a touch panel in which an input device and a display device are integrated. This configuration is, however, merely one example, and the function for receiving various operation inputs and the function for displaying various types of information do not necessarily need to be integrated, and an input unit and a display unit may be provided separately.

The communication control unit 12 is a functional unit that controls the communication with another device such as the sensor 20. Merely as one example, the communication control unit 12 may be implemented as a network interface card. As one aspect, the communication control unit 12 can receive the channel measurement data from the sensor 20. The communication between the information processing apparatus 10 and the sensor 20 does not always need to be bidirectional, and the sensor 20 may also communicate serially with the information processing apparatus 10.

The storage unit 13 is a functional unit that stores therein various types of data. Merely as one example, the storage unit 13 is implemented as a storage provided internal or external of the information processing apparatus 10, or as an auxiliary storage. For example, the storage unit 13 stores therein a measurement data log 13A, a diagnostic model 13B, a health score (HS) log 13C, and an error-contribution ratio log 13D. Explanation of the measurement data log 13A, the diagnostic model 13B, the HS log 13C, and the error-contribution ratio log 13D will be given together with a stage at which reference, creation, or registration is performed.

The control unit 15 is a functional unit that controls the entire information processing apparatus 10. The control unit 15 may be implemented as a hardware processor, for example. As illustrated in FIG. 1, the control unit 15 includes a measurement data acquiring unit 15A, an error determining unit 15B, an error-contribution ratio calculating unit 15C, and an output control unit 15D. The control unit 15 may also be implemented as a hard-wired logic, for example.

The measurement data acquiring unit 15A is a processing unit that acquires the measurement data. Merely as one example, the measurement data acquiring unit 15A acquires, for each batch corresponding to one process of a product manufacturing process, channel measurement data for each of the channel measurement targets, such as those of a piece of equipment used in a facility corresponding to the process, from each of the sensors 20 corresponding to the channel.

The "batch" herein means an interval corresponding to one process of a product manufacturing process, and may be defined by start time and end time, for example. To use a tire manufacturing process as an example, the interval between the beginning and the end of vulcanization for enhancing the strength of tires is considered as a batch.

For example, the measurement data acquiring unit 15A acquires, upon completion of the batch, channel measurement data of the interval corresponding the batch from the sensors 20 corresponding the respective channels. At this time, the measurement data acquiring unit 15A may cause the sensors 20 to transmit measurements in real time and accumulate the measurements over the interval corresponding to the batch, or cause the sensors 20 to transmit all of the channel measurement data over the entire interval corresponding to the batch at once, upon completion of the batch.

Once the channel measurement data corresponding to the N channels has been acquired, channel measurement data corresponding to the N channels is placed into one data file as measurement data, and is added and stored in the measurement data log 13A that is stored in the storage unit 13. In this manner, the storage unit 13 comes to store therein the measurement data including the channel measurement data corresponding to the N channels, in units of one batch, as the measurement data log 13A. When the measurement data acquiring unit 15A stores the measurement data in the storage unit 13, the measurement data acquiring unit 15A may store the measurement data by mapping a name, such as identification information or a tag name, that is preassigned to the channel, to the channel measurement data.

The error determining unit 15B is a processing unit that determines whether there is an error in the batch, using the diagnostic model 13B. At this time, the diagnostic model 13B is implemented as, merely as one example, a machine learning model having been trained. In the explanation hereunder, a support vector machine (SVM) will be used as one example of the diagnostic model 13B, but the diagnostic model 13B may also be implemented as another type of machine learning model, such as a neural network.

Figure 2:
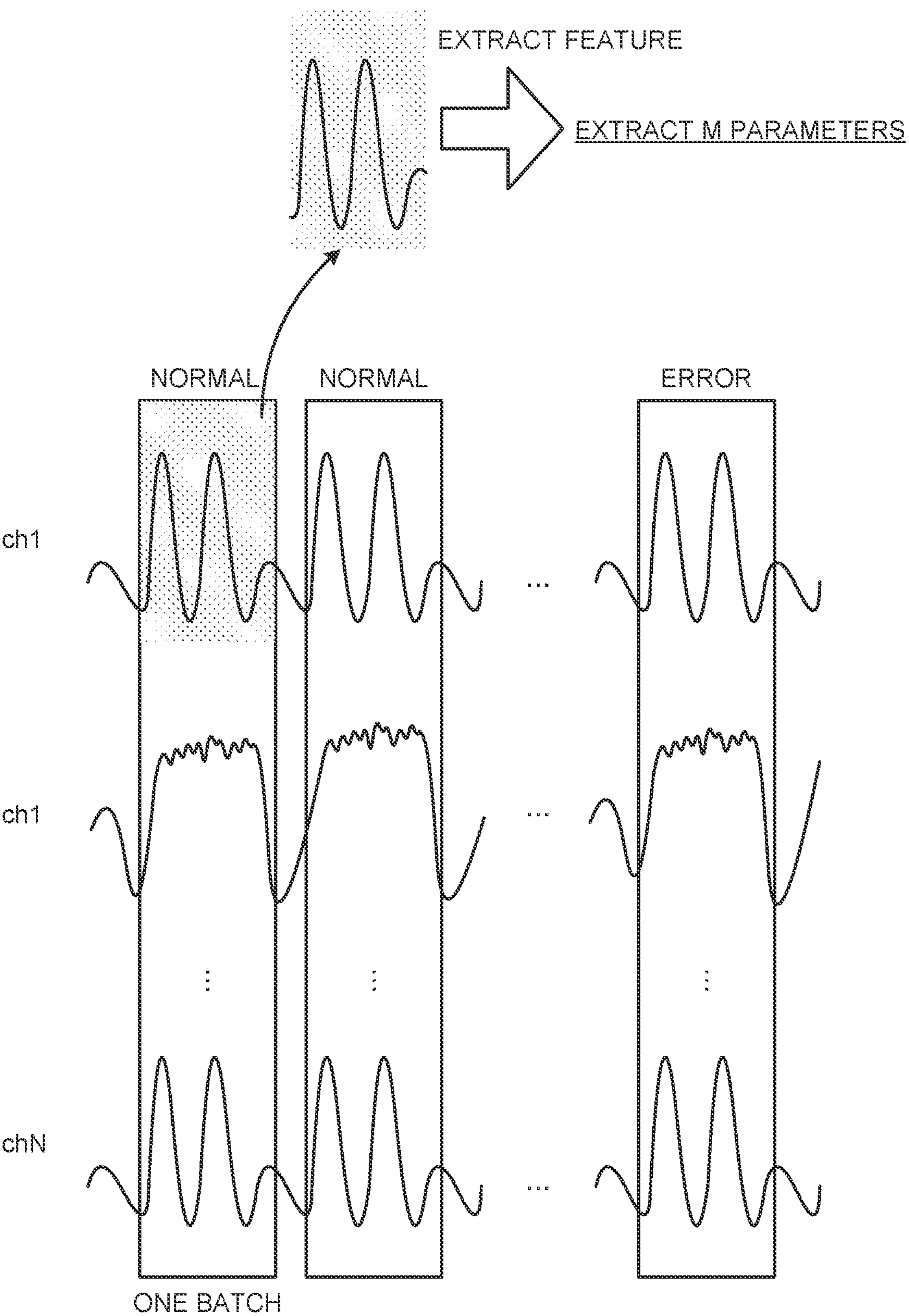
FIG. 2 is a schematic illustrating one example of measurement data.

More specifically, when measurement data has been acquired by the measurement data acquiring unit 15A, the error determining unit 15B extracts one or more parameters from the measurement data, for each channel measurement data included in the measurement data. FIG. 2 is a schematic illustrating one example of the measurement data. FIG. 2 illustrates the measurement data including the measurement data corresponding to channel ch1 to channel chN over one batch, in a manner surrounded by a frame in a solid line. As illustrated in FIG. 2, one piece of measurement data includes pieces of channel measurement data corresponding to the N channels, respectively, and M parameters (where M is a natural number) are extracted from each piece of the channel measurement data. To extract these parameters, any method such as feature selection or a feature extraction may be used. Merely as one example, the error determining unit 15B may apply statistical processing such as averaging or variance processing to the piece of channel measurement data corresponding to one batch, to extract an average or a variance, as an example of a feature corresponding a piece of channel measurement data over one batch. In the manner described above, M parameters are extracted for each of the channels.

The error determining unit 15B then inputs the parameter corresponding to each of the N channels and each of M types of the parameters to the diagnostic model 13B read from the storage unit 13. Using the N×M parameters thus input as an input vector, the diagnostic model 13B outputs a distance between the input vector and a classification boundary CB that is a hyperplane for classifying the presence and the absence of an error in the batch, as HS. At this time, if HS output from the diagnostic model 13B is equal to or more than zero, the error determining unit 15B determines that there is no error in the batch. If HS output from the diagnostic model 13B is less than zero, the error determining unit 15B determines that there is some error in the batch.

Such a diagnostic model 13B can be generated by training, an example of which will be explained below. For example, machine learning is run using the N×M parameters as training samples, and using a set of training data assigned with correct classes, e.g., labeled as "normal" or "error", as a data set, for example. For example, with a SVM, parameters of a discriminant function that maximizes the distance, that is, what is called a margin, between the support vector and the classification boundary CB is trained. The "support vector" herein corresponds to the feature vector of the training data positioned near the boundary between the training data set assigned with the label of the normal class and the training data assigned with the label of the error class. A classifier that classifies the parameters to the normal class or the error class depending on whether the sign of the value output from the discriminant function is a plus or minus is stored in the storage unit 13 as the diagnostic model 13B.

Figure 3:
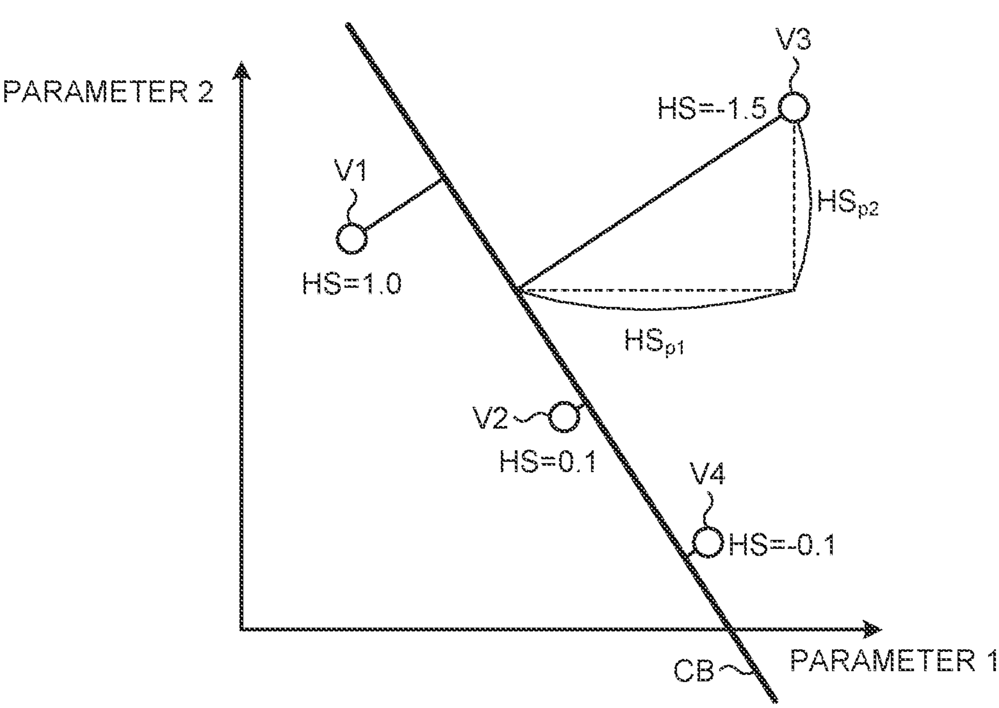
FIG. 3 is a schematic illustrating one example of a parameter HS.

In addition to HS described above, the diagnostic model 13B may also be configured to output the parameter HS for each type of the parameters. FIG. 3 is a schematic illustrating one example of the parameter HS. For the convenience of the explanation, FIG. 3 illustrates a two-dimensional feature space in which the number M of parameter types is "2", including parameter 1 and parameter 2, with the classification boundary CB used by the diagnostic model 13B plotted in the feature space.

As illustrated in FIG. 3, in response to an input of an input vector V1, the diagnostic model 13B outputs 1.0 as HS. In response to an input of an input vector V2, the diagnostic model 13B outputs 0.1 as HS. In response to an input of an input vector V3, the diagnostic model 13B outputs −1.5 as HS. In response to an input of an input vector V4, the diagnostic model 13B outputs −0.1 as HS. For these input vectors V1 to V4, it can be determined that there are no errors in the batch corresponding to the input vector V1 and the batch corresponding to the input vector V2, but there are errors in the batch corresponding to the input vector V3 and the batch corresponding to the input vector V4.

In addition to HSes described above, the diagnostic model 13B calculates distances for the respective parameter types, the distances together forming the distance between the feature vector corresponding to the one or more parameters and the classification boundary CB. Merely as one example, the diagnostic model 13B can output, for each evaluation axis corresponding to a parameter type, a distance of the component corresponding to such an evaluation axis, the component being that of HS that is the distance between the input vector and the classification boundary CB, as a parameter HS. For example, to explain using the example of the input vector V3, the diagnostic model 13B can output a distance of a component corresponding to the parameter type "parameter 1", as a parameter $HS_{p1}$. The diagnostic model 13B can also can output the distance of a component corresponding to the parameter type "parameter 2" as a parameter $HS_{p2}$. In this manner, the diagnostic model 13B can output parameter $HS_{p1}$ to parameter $HS_{pM}$ in the number corresponding to the number M of parameter types, for one channel.

In this manner, HS and the parameter HSes output from the diagnostic model 13B are added to and stored in the HS log 13C that stored in the storage unit 13. In this manner, the storage unit 13 stores therein, for each batch, HS for the entire batch, and the parameter HS corresponding to each of the channels and each of the parameter types, as the HS log 13C.

The error-contribution ratio calculating unit 15C is a processing unit that calculates, for each of the channels, the degree by which the channel contributes to the error. Merely as one example, the error-contribution ratio calculating unit 15C can calculate an error-contribution ratio for each channel based on the sum of the parameter HSes corresponding to the channel, the sum calculated for each of the channels.

FIG. 4 is a schematic diagram illustrating an example of calculations of the error-contribution ratios. FIG. 4 illustrates results of calculating the parameter HSes in a table format, under an assumption that the number N of channels is four, and the number M of parameter types extracted for one channel is five, merely as one example. To explain using the example illustrated in FIG. 4, the error-contribution ratio calculating unit 15C takes the sum of the five parameter HSes that are those of parameters 1 to 5 corresponding to channel ch1. In other words, by calculating "0.01224+0.22005−0.043275−0.037099+0.35362", the error-contribution ratio of channel ch1 is calculated as "0.505536". In the same manner, by taking the sum of the five parameter HSes corresponding to channel ch2, the error-contribution ratio calculating unit 15C calculates the error-contribution ratio of channel ch2 as "0.463747". The error-contribution ratio calculating unit 15C also calculates the error-contribution ratio of channel ch3 as "−0.37696", and calculates the error-contribution ratio of channel ch4 as "−0.33223". To explain using the example of the error-contribution ratios illustrated in FIG. 4, it means that, when a channel has a lower error-contribution ratio, that is, when the error-contribution ratio has a minus sign with a larger absolute value, the channel contributes more to the error, for example.

The error-contribution ratios thus calculated for the respective channels are then added to and stored in the error-contribution ratio log 13D stored in the storage unit 13. In this manner, the storage unit 13 comes to store therein the error-contribution ratios for the respective channels, as the error-contribution ratio log 13D, for each batch.

Explained herein is an example in which the error-contribution ratio calculating unit 15C calculates, for each of the channels, the sum of the parameter HSes corresponding to the channel, as the error-contribution ratio of the channel. However, without limitation to the sum, the error-contribution ratio calculating unit 15C may also calculate the error-contribution ratio using another calculation method, for example, calculate a value by further modifying the sum. For example, it is possible to regularize the error-contribution ratio so as to become higher when the corresponding channel contributes more to the error, or to normalize the error-contribution ratio so that the value falls within a specific value range, e.g., 0 to 1, or 0 to 100.

The output control unit 15D is a processing unit that performs various types of output control. Merely as one example, the output control unit 15D controls outputs to the display input unit 11. In the explanation herein, an output for displaying is used as one example of the output controlled by the output control unit 15D, but needlessly to say, the output control unit 15D may control other types of outputs such as a printing output or an audio output.

As one aspect, when a request for displaying the error-contribution ratios is received via the display input unit 11, the output control unit 15D displays, for the batch designated in the request, the error-contribution ratios of the respective channels, among the error-contribution ratios included in the error-contribution ratio log 13D.

Figure 5:
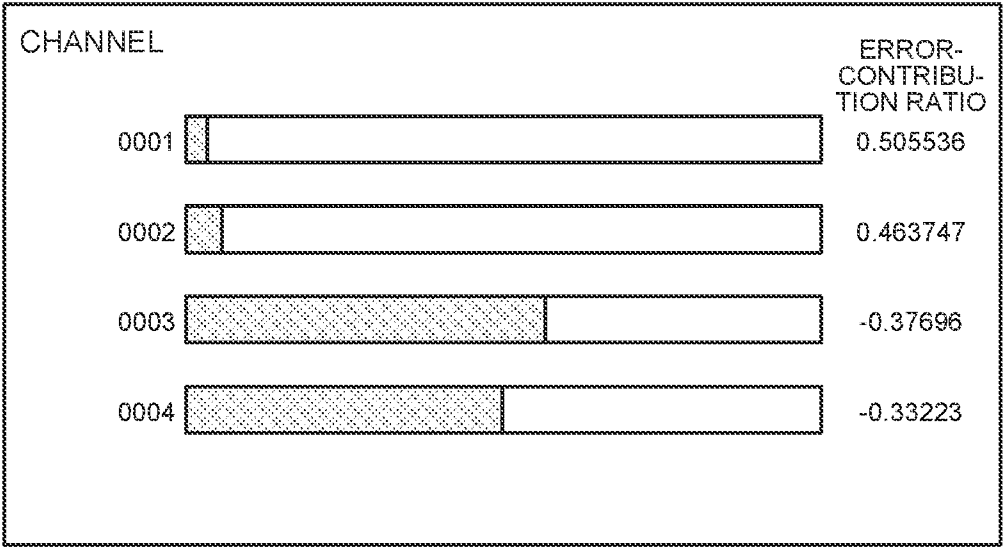
FIG. 5 is a schematic illustrating a displaying example of the error-contribution ratios.

As one example, the output control unit 15D may display the error-contribution ratios of the respective channels, in a manner mapped with pieces of channel identification information, such as channel numbers, associated to the respective channels. FIG. 5 is a schematic illustrating a displaying example of the error-contribution ratios. FIG. 5 illustrates a displaying example of the error-contribution ratios indicated in FIG. 4. To explain using the example illustrated in FIG. 5, for each of the channel numbers "0001" to "0004" corresponding to the channels ch1 to chN, respectively, numeric values of the error-contribution ratios corresponding to the respective channel numbers are displayed as bars representing the respective numeric values. By displaying such a screen, the error-contribution ratios can be presented to a user, such as a field worker, in a manner enabling the user to identify the channels.

Figure 6:
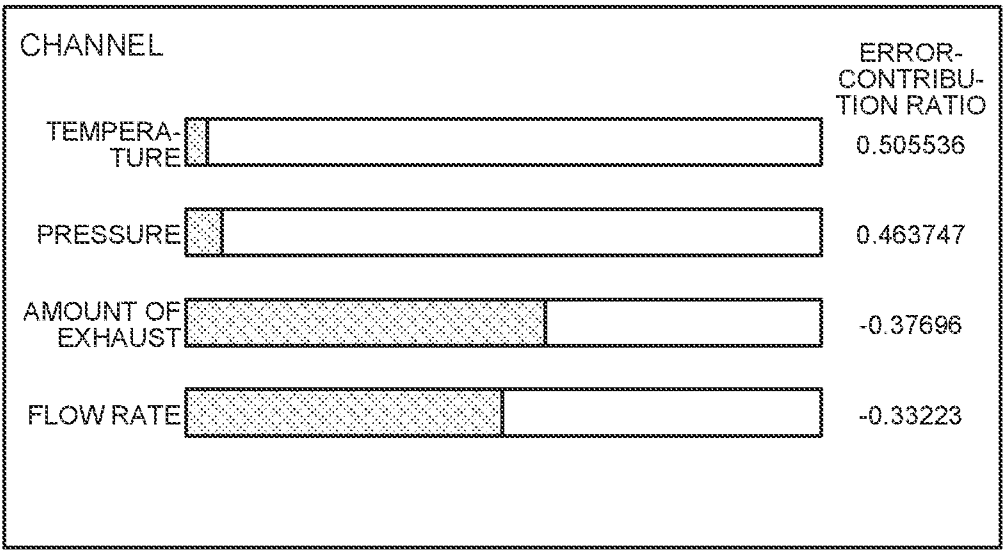
FIG. 6 is a schematic illustrating a displaying example of the error-contribution ratios.

As another example, the output control unit 15D may display the error-contribution ratios by mapping pieces of tag information, such as tag names, mapped to the respective channels. FIGS. 6 and 7 are schematics illustrating displaying examples of the error-contribution ratios. FIGS. 6 and 7 also illustrate displaying examples of the error-contribution ratios indicated in FIG. 4. To explain using the example illustrated in FIG. 6, for each of the tag names "temperature" to "flow rate" corresponding to channel ch1 to channel chN, respectively, a bar is displayed in a manner mapped to the numeric value of the error-contribution ratio corresponding to the tag name, in addition to the numeric value. In displaying the numeric values of the error-contribution ratios and the bars corresponding thereto for each channel, the output control unit 15D may display the numeric values of the respective error-contribution ratios outside of the respective bars, as illustrated in FIG. 6, or display the numeric values of the respective error-contribution ratios inside the respective bars, as illustrated n FIG. 7. These tag names to be displayed may be any character sequences that are based on user settings entered by a field worker or any authorized person such as an operator. Although FIG. 7 illustrates an example in which the numeric values of the respective error-contribution ratios are indicated inside the frame of the bar chart but outside the bars, but the numeric values of the respective error-contribution ratios may also be displayed inside the respective bars. Furthermore, FIGS. 6 and 7 illustrate an example in which character sequences are displayed as the tag names, but it is also possible to display icons or the like assigned to the respective tags.

As still another example, the output control unit 15D may sort the error-contribution ratios corresponding to the respective channels in the ascending or descending order, and display the error-contribution ratios of the channels in the sorted order. FIG. 8 is a schematic illustrating a displaying example of the error-contribution ratios. FIG. 8 also illustrates a displaying example of the error-contribution ratios indicated in FIG. 4. To explain using the example illustrated in FIG. 8, the error-contribution ratios are displayed sorted in the order from those with smaller error-contribution ratios, that is, in the ascending order. In other words, by sorting the error-contribution ratios "0.505536", "0.463747", "−0.37696" and "−0.33223" corresponding to the respective four channels ch1 to ch4 in the ascending order, the error-contribution ratios are reordered as channel ch3, channel ch4, channel ch2, and channel ch1. The error-contribution ratios "−0.37696", "−0.33223", "0.463747"

and "0.505536" corresponding to the respective tag names are displayed in the sorted order, that is, in the order of those with the tag names "amount of exhaust", "flow rate", "pressure", and "temperature". With such a display, a field worker or the like can quickly recognize the channels contributing more to the error or less to the error.

Figure 9:
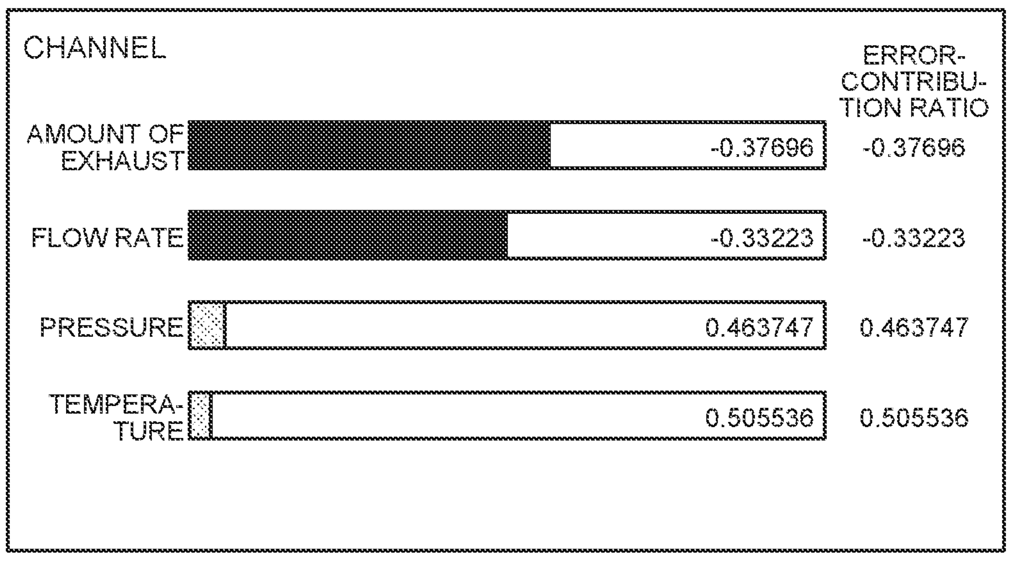
FIG. 9 is a schematic illustrating a displaying example of the error-contribution ratios.

As another example, the output control unit 15D may display, among the error-contribution ratios corresponding to the respective channels, a channel having an error-contribution ratio satisfying a specific condition in a display mode that is different from those of the other channels. FIG. 9 is a schematic illustrating a displaying example of the error-contribution ratios. FIG. 9 also illustrates a displaying example of the error-contribution ratios indicated in FIG. 4. Furthermore, FIG. 9 illustrates an example in which channels having error-contribution ratios equal to or lower than a threshold, e.g., zero, are displayed in a display mode different from that of the channels having error-contribution ratios higher than zero. As illustrated in FIG. 9, among the four channels, the error-contribution ratios with the tag names "amount of exhaust" and "flow rate", the error-contribution ratios of which are equal to or lower than zero, are displayed in a display mode different from that of the error-contribution ratios with the tag name "pressure" and "temperature", the error-contribution ratios of which are higher than zero. In other words, by changing the hatching of the bars representing the error-contribution ratios, the error-contribution ratios with the tag names having error-contribution ratios equal to or lower than zero are displayed in an emphasized manner. With this display, too, a field worker or the like can quickly recognize the channel contributing more to the error. In the example illustrated in FIG. 9, the hatching of the bars is changed, but it is also possible to display the error-contribution ratios of the channels contributing more to the error in an emphasized manner, by changing the color of the bars or changing the fonts of the numeric values of the respective error-contribution ratios.

Figure 10:
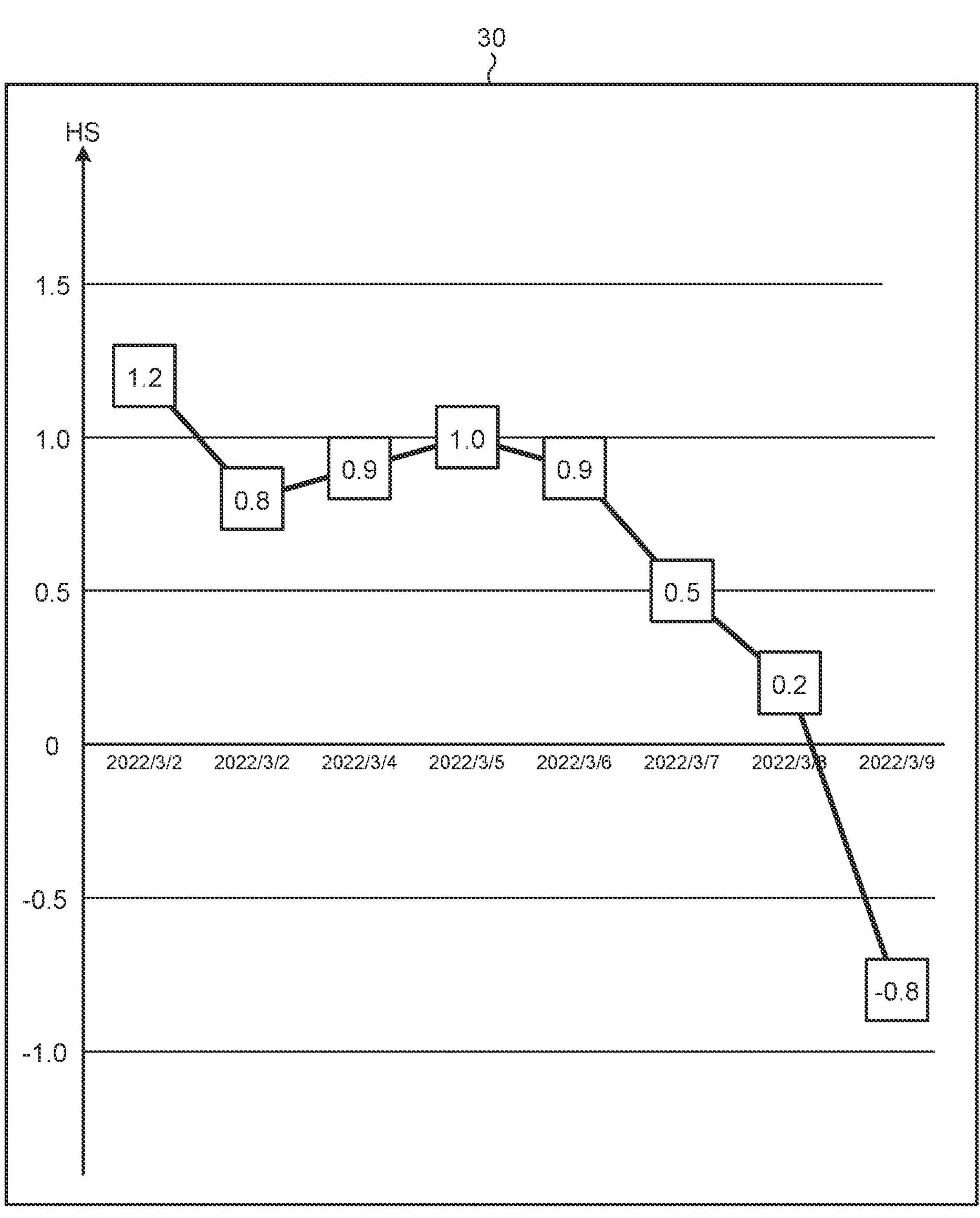
FIG. 10 is a schematic illustrating one example of an HS trend screen.

At this time, the request for displaying the error-contribution ratios can be received via a graphical user interface (GUI) related to HS. FIG. 10 is a schematic illustrating one example of an HS trend screen. As illustrated in FIG. 10, this HS trend screen 30 displays a chronological transition of HS. In other words, the HS trend screen 30 displays the batches as blocks that are schematization of the batches in the chronological order, and HSes of the respective batches are indicated as numeric values, respectively, inside of the corresponding blocks (inside corresponding quadrilateral frames), respectively. An operation of selecting a block in this HS trend screen 30 can then be received as a displaying request. For example, in response to receipt of an operation of selecting a block corresponding to the batch on Mar. 9, 2022 (a quadrilateral surrounding −0.8), it is possible to display the error-contribution ratios of the respective channels corresponding to the batch of Mar. 9, 2022, among the error-contribution ratios included in the error-contribution ratio log 13D. By displaying the error-contribution ratios following such a sequence, it is possible to display how the error-contribution ratios have transitioned chronologically.

As another aspect, in addition to the pull-strategy for providing information, by which the error-contribution ratios are displayed in response to a display request, the output control unit 15D may also provide a push notification for causing the computer program or instructions implementing the factor analysis function to automatically notify a user. For example, when HS included in the HS log 13C satisfies a specific condition, the output control unit 15D may display error-contribution ratios corresponding to the respective channels.

Merely as one example, when there is an update in the HS log 13C, the output control unit 15D determines whether the latest HS is equal to or lower than a threshold Th1, e.g., "1". If the latest HS is equal to or lower than the threshold Th1, the output control unit 15D calculates an approximation line corresponding to the distribution of HSes from the history of the past HSes, e.g., a specific number of HSes prior to the latest one, using regression analysis. If the gradient a of the calculated approximation line is equal to or smaller than a threshold Th2, e.g., −1, the output control unit 15D displays the latest error-contribution ratios corresponding to the respective channels, among the error-contribution ratios included in the HS log 13C. In this manner, it is possible to provide information useful for clarification of the cause, not only when an error has occurred, but also when there is a sign of an error. At this time, a sign of an error herein means a condition in which no error has occurred with the latest HS being within the range of 0 to 1, but the gradient of the approximation line is exhibiting a decreasing tendency at a level equal to or smaller than −1. With this, it is possible to presume that an error will occur in the future, with HS falling to a level equal to or lower than zero. In the example explained herein, the threshold Th1 and the threshold Th2 are used as constraints imposed on displaying of the error-contribution ratios, but only one of these thresholds may be imposed as the constraint.

Sequence of Processes

The sequence of processes performed by the information processing apparatus 10 according to one or more embodiments will now be explained. At this time, an explanation of (1) an error-contribution ratio calculating process is followed by an explanation of (2) an output control process, both of these processes being performed by the information processing apparatus 10.

(1) Error-Contribution Ratio Calculating Process

FIG. 11 is a flowchart illustrating the sequence of the error-contribution ratio calculating process. This process may be executed upon completion of one batch, merely as one example. As illustrated in FIG. 11, the measurement data acquiring unit 15A acquires measurement data corresponding to one batch by acquiring channel measurement data for each of the N channels that are the measurement targets (Step S101).

Loop process 1 and loop process 2 are then executed. Loop process 1 and loop process 2 are processes for repeating the process at Step S102 described below by the number of times corresponding to the N channels acquired at Step S101, and by the number of times corresponding to the number M of types of parameters input to the diagnostic model 13B within each run of the N times, respectively. Although FIG. 11 illustrates an example in which the process at Step S102 is repeated, the process at Step S102 does not always need to be repeated serially, and may also be executed in parallel, correspondingly to the N channels and the M types, respectively.

In other words, the error determining unit 15B extracts the parameters corresponding to parameter type j, from the channel measurement data corresponding to channel i (Step S102).

Step S102 described above is repeated until the index j is incremented to M, with 1 set as the initial value. Through such a loop process 2, the M types of parameters can be extracted per one channel. In the example explained herein, M types of parameter are extracted for one channel, but the numbers of parameter types do not necessarily need to be the same and may be different among the channels i.

Step S102 is repeated until the index i is incremented to N, with 1 set as the initial value. Through loop process 1, M types of parameters can be extracted for each of the N channels. In the example explained herein, the number N of the channels and the number M of parameter types are plural, but any one or both of the number N of the channels and the number M of parameter types may also be one.

The error determining unit 15B inputs the parameter corresponding to each of the N channels and each of the M parameter types, to the diagnostic model 13B read from the storage unit 13 (Step S103). The error-contribution ratio calculating unit 15C then acquires the parameter HS output from the diagnostic model 13B, correspondingly to each of the N channels and each of the M parameter types (Step S104).

Loop process 3 for repeating the process at Step S105 described below are then executed by the number of N channels. Although FIG. 11 illustrates an example in which the process at Step S105 is repeated, but the process at Step S105 does not always need to be repeated serially, and may also be executed in parallel, correspondingly to the N channels, respectively.

In other words, the error-contribution ratio calculating unit 15C calculates the error-contribution ratio of the channel i, based on the sum of the parameter HSes corresponding to the channel i (Step S105).

Step S105 described above is repeated until the index i is incremented to N, with the initial value set to 1. Through loop process 3, an error-contribution ratio can be calculated for each of the N channels.

The error-contribution ratio calculating unit 15C adds and stores the error-contribution ratios calculated for the respective N channels, to and in the error-contribution ratio log 13D that is stored in the storage unit 13 (Step S106), and ends the process.

(2) Output Control Process

Figure 12:
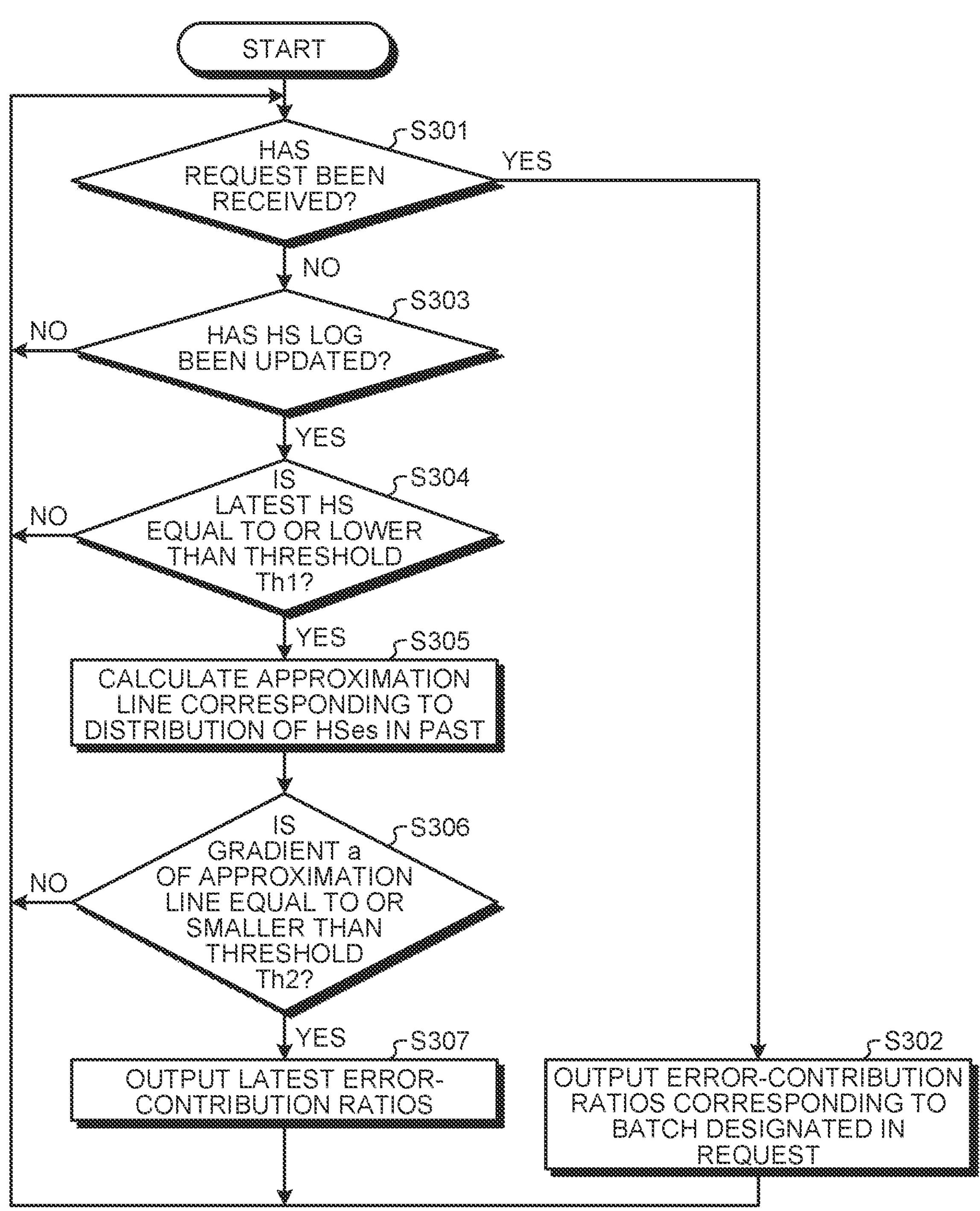
FIG. 12 is a flowchart illustrating the sequence of an output control process.

FIG. 12 is a flowchart illustrating the sequence of the output control process. Merely as one example, this process may be repeated while the information processing apparatus 10 is ON.

As illustrated in FIG. 12, if the request for displaying the error-contribution ratio has been received (Yes at Step S301), the output control unit 15D performs the following process. In other words, the output control unit 15D displays, among the error-contribution ratios included in the error-contribution ratio log 13D, those corresponding to the respective channels that are relevant to the batch designated in the request onto the display input unit 11 (Step S302), and goes to Step S301.

By contrast, if the request for displaying the error-contribution ratio has been received (No at Step S301), the output control unit 15D determines whether the HS log 13C has been updated (Step S303).

If the HS log 13C has been updated (Yes at Step S303), the output control unit 15D determines whether the latest HS is equal to or lower than the threshold Th1, for example, "1" (Step S304).

If the latest HS is equal to or lower than the threshold Th1 (Yes at Step S304), the output control unit 15D calculates an approximation line corresponding to the distribution of HSes from the history of the past HSes, e.g., a specific number of HSes prior to the latest one, using regression analysis (Step S305).

If the gradient a of the approximation line calculated in the manner described above is equal to or smaller than the threshold Th2, e.g., −1 (Yes at Step S306), the output control unit 15D performs the following process. In other words, the output control unit 15D displays the latest error-contribution ratios for the respective channels, among the error-contribution ratios included in the HS log 13C (Step S307), and goes to Step S301.

One Aspect of Advantageous Effects

As described above, the information processing apparatus 10 according to one or more embodiments provides a factor analysis function for calculating an error-contribution ratio for each channel. By displaying the error-contribution ratios corresponding to the respective channels, the error-contribution ratios being calculated by the factor analysis function, it is possible to identify which channel is causing an error at a glance. Therefore, when an error occurs, users can understand around which channel is to be checked at a higher priority, from the situation in which conventionally users have been lost where to start the investigation. In other words, because the users are given an index for the investigation at the time when an error occurs, it is possible to reduce the hours required in the investigation.

Numeric Value, Etc.

Specific examples of the matters explained in the above embodiments, such as the number of channels and the sensors, the number of the parameters, the method for extracting the parameters, and the method for calculating HSes and the parameter HSes, are provided only for the illustrative purpose, and may be modified. Furthermore, the order of steps in the flowchart explained in the above embodiments may also be changed within the scope in which the steps do not contradict with one another.

System

The processing sequence, the control sequence, the specific names, and information including various types of data and parameters indicated above or in the drawings may be changed in any way, unless specified otherwise. For example, any one or more functional units among the measurement data acquiring unit 15A, the error determining unit 15B, the error-contribution ratio calculating unit 15C, and the output control unit 15D may be configured as separate devices.

The elements of each of the devices illustrated are merely functional and conceptual representations, and do not always need to be physically configured in the manner illustrated. In other words, specific configurations in which the devices are distributed or integrated are not limited those illustrated in the drawings. To put it in other words, whole or a part thereof may be functionally or physically distributed or integrated into any units, depending on various loads and utilizations. The configurations may also be physical configurations.

Furthermore, whole or any part of the processing functions executed in each of the devices may be implemented as a central processing unit (CPU) and a computer program or instructions parsed and executed by the CPU, or as hardware using wired logics.

Hardware

Figure 13:
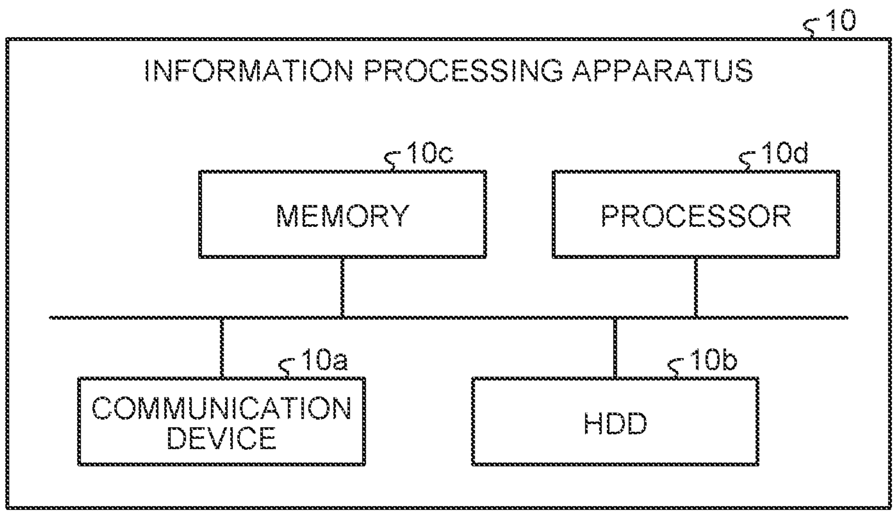
FIG. 13 is a schematic illustrating an exemplary hardware configuration.

An exemplary hardware configuration of the computer explained in the above embodiments will now be explained. FIG. 13 is a schematic for explaining the exemplary hardware configuration. As illustrated in FIG. 13, the information processing apparatus 10 includes a communication device (or a communication interface) 10*a*, a hard disk drive (HDD) 10*b*, a memory 10*c*, and a processor 10*d* that may comprise the CPU. The units illustrated in FIG. 13 are connected to one another via a bus, for example.

The communication device 10*a* is a network interface card, for example, and communicates with another server. The HDD 10*b* stores therein a computer program or instructions for operating the functions illustrated in FIG. 1 and a database (DB).

The processor 10*d* runs processes for performing the functions explained with reference to FIG. 1 or the like, by reading a computer program or instructions for executing processes that are the same as those executed by the processing units illustrated in FIG. 1 from the HDD 10*b*, for example, and loading the computer program or instructions onto the memory 10*c*. For example, this process performs the same functions as those performed by the processing units included in the information processing apparatus 10. Specifically, the processor 10*d* reads a computer program or instructions having the same functions as those of the measurement data acquiring unit 15A, the error determining unit 15B, the error-contribution ratio calculating unit 15C, and the output control unit 15D, for example, from the HDD 10*b* or the like. The processor 10*d* then performs the process for performing the same process as those performed by the measurement data acquiring unit 15A, the error determining unit 15B, the error-contribution ratio calculating unit 15C, the output control unit 15D, and the like.

By reading and executing a computer program or instructions in the manner described above, the information processing apparatus 10 operates as an information processing apparatus executing the factor analysis method. The information processing apparatus 10 may also implement the functions that are the same as those described in the above embodiments, by causing a medium reading device to read the computer program or instructions described above from a recording medium, and by executing the computer program or instructions. The computer program or instructions mentioned in such another embodiment are not limited to those executed by the information processing apparatus 10. For example, the present invention may be applied in the same manner in configurations in which another computer or a server executes the computer program or instructions, or in which these devices execute the computer program or instructions by cooperating with each other.

The computer program or instructions described above may be distributed over a network such as the Internet. Furthermore, the computer program or instructions described above may be stored in a recording medium, and executed by a computer having read the computer program or instructions from the recording medium. For example, the recording medium may be implemented as a hard disk, a flexible disk (FD), a compact disc read-only memory (CD-ROM), a magneto-optical disc (MO), or a digital versatile disc (DVD).

According to one or more embodiments, there is provided an information processing apparatus, a factor analysis method, and a computer-readable recording medium which can aid investigations of a cause of an error.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

What is claimed is:

1. An error factor analysis apparatus comprising:

a display; and a controller that:

acquires, from a sensor disposed in each of multiple channels in a facility for manufacturing a product, measurement data of a physical quantity including at least one of a temperature, pressure, flow rate, pH, flow speed, acceleration, and valve aperture of each of the channels, determines health scores for respective parameters extracted from the measurement data acquired for each of the channels, based on a difference between each of the parameters and a classification boundary used by a machine learning model that classifies the parameters into an error class or a normal class, calculates, by adding up the health scores of all the parameters for each of the channels, error-contribution ratios of the channels, identifies from among all the channels, by comparing the error-contribution ratios to each other, a channel in which an error occurred, and modifies graphics of the display to:

display a health score trend screen in which a chronological transition of the health scores and blocks respectively corresponding to batches of channels are indicated, and upon receiving an input to select one of the blocks, distinguishably highlight, among the channels with a date corresponding to the selected block, a channel that has an error-contribution ratio satisfying a predetermined condition to aid an investigation of a cause of the error.

2. The error factor analysis apparatus according to claim 1, wherein the controller calculates the health scores by calculating distances corresponding to respective types of the parameters, and the distances together form a distance between a feature vector corresponding to one or more of the parameters and the classification boundary.

3. The error factor analysis apparatus according to claim 1, wherein the controller displays the error-contribution ratios by mapping the error-contribution ratios to identification information associated with the channels.

4. The error factor analysis apparatus according to claim 1, wherein the controller displays the error-contribution ratios by mapping the error-contribution ratios to tag information associated with the channels.

5. The error factor analysis apparatus according to claim 1, wherein the controller displays the error-contribution ratios in a resultant order of sorting the error-contribution ratios of the channels in an ascending order or a descending order.

6. The error factor analysis apparatus according to claim 1, wherein the controller displays the channels whose error-contribution ratios satisfy a specific condition, in a first display mode that is different from a second display mode in which another of the channels is displayed.

7. A error factor analysis method for an error factor analysis apparatus comprising a display, the method comprising:

acquiring, from a sensor disposed in each of multiple channels in a facility for manufacturing a product, measurement data of a physical quantity including at least one of a temperature, pressure, flow rate, pH, flow speed, acceleration, and valve aperture of each of the channels;

determining health scores for respective parameters extracted from the measurement data acquired for each of the channels, based on a difference between each of the parameters and a classification boundary used by a machine learning model that classifies the parameters into an error class or a normal class;

calculating, by adding up the health scores of all the parameters for each of the channels, error-contribution ratios of the channels;

identifies from among all the channels, by comparing the error-contribution ratios to each other, a channel in which an error occurred; and modifying graphics of the display to:

display a health score trend screen in which a chronological transition of the health scores and blocks respectively corresponding to batches of channels are indicated, and upon receiving an input to select one of the blocks, distinguishably highlight, among the channels with a date corresponding to the selected block, a channel that has an error-contribution ratio satisfying a predetermined condition to aid an investigation of a cause of the error.

8. A non-transitory computer-readable recording medium storing instructions that cause an error factor analysis apparatus comprising a display to execute:

acquiring, from a sensor disposed in each of multiple channels in a facility for manufacturing a product, measurement data of a physical quantity including at least one of a temperature, pressure, flow rate, pH, flow speed, acceleration, and valve aperture of each of the channels;

determining health scores for respective parameters extracted from the measurement data acquired for each of the channels, based on a difference between each of the parameters and a classification boundary used by a machine learning model that classifies the parameters into an error class or a normal class;

calculating, by adding up the health scores of all the parameters for each of the channels, error-contribution ratios of the channels;

identifying from among all the channels, by comparing the error-contribution ratios to each other, a channel in which an error occurred; and modifying graphics of the display to:

display a health score trend screen in which a chronological transition of the health scores and blocks respectively corresponding to batches of channels are indicated, and upon receiving an input to select one of the blocks, distinguishably highlight, among the channels with a date corresponding to the selected block, a channel that has an error-contribution ratio satisfying a predetermined condition to aid an investigation of a cause of the error.

* * * * *